May 31, 1927.  1,630,535

H. MAUL

PNEUMATIC TIRE

Filed Dec. 2, 1926

INVENTOR.
Hans Maul
BY
ATTORNEY.

Patented May 31, 1927.

1,630,535

UNITED STATES PATENT OFFICE.

HANS MAUL, OF PASING, NEAR MUNICH, GERMANY.

PNEUMATIC TIRE.

Application filed December 2, 1926. Serial No. 152,117.

My invention relates to vehicle wheel tires and more especially to automobile pneumatic tires, and the particular object of my invention is to produce a tire possessing the high degree of elasticity and shock absorbing qualities of the present-day tire but in addition thereto insuring greater safety and having a longer life than the pneumatic tires now in use.

Attempts have been made to replace the pneumatic tire by solid tires provided with inner air cavities or having inner tubes incorporated therein, but such tires are based on the idea of increasing the thickness of the tread. Extensive tests, however, have shown that it is not the tread of a tire which is subjected to the greatest strain, as has always been erroneously assumed, but that it is rather the lateral walls of a tire, which have to bear the principal strain, for the reason that all the shocks must be absorbed by the lateral walls of the tire resulting in continual deformation of said lateral walls. As a consequence thereof, there occur very frequent ruptures in the said lateral walls especially when the tire is partially deflated.

To overcome this serious defect of the present-day pneumatic tire, the tire constituting the subject matter of the present invention is so designed that its lateral walls, in case of an over-load or partial or entire deflation of the inner tube effectively prevent the pinching or squeezing of the tire, in that the lateral walls, as the tread of the tire becomes flattened will assume a substantially perpendicular position, which position enables them to support the load without being squeezed or becoming pinched.

Figure 1:
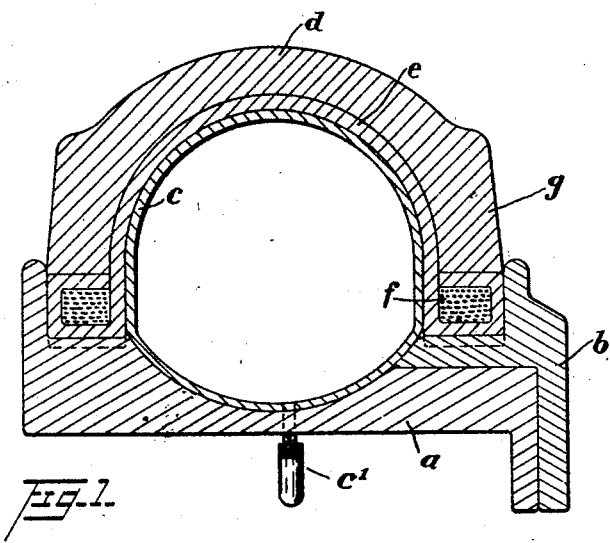
Figure 2:
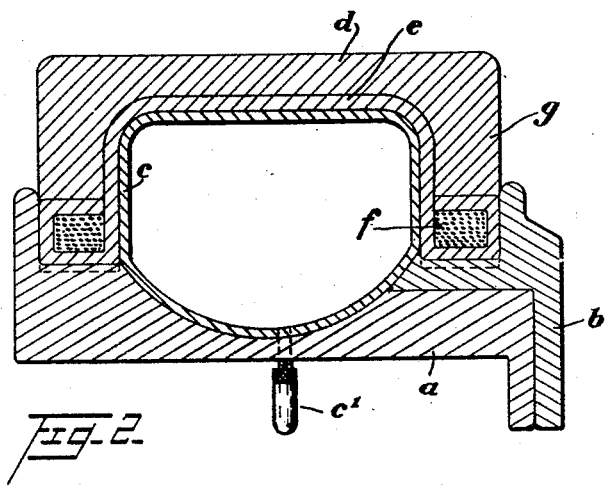

On the accompanying drawing, in which I have illustrated my invention, by way of example, Fig. 1 shows an embodiment of the new tire in cross-section not under load, while Fig. 2 is a cross-section of such a tire under load.

In the drawing, $a$, $b$ represent the divided rim, on which is placed the inner tube $c$ equipped with the usual air-valve $c^1$. Over the inner tube $c$ is placed the outer tire or casing $d$, which, in the embodiment shown is provided with a lining $e$ and enlarged beads $f$. The lateral walls $g$ are inclined at an acute angle toward the tread, which normally is of rounded shape. When the inner tube $c$ becomes partially or entirely deflated, the tread is flattened and correspondingly becomes expanded. Because of such expansion, the lateral walls of the tire are shifted in such a way that they will assume a position practically perpendicular to the flattened tread being parallel with each other. Thereby the usual squeezing or pinching of the tire, which occurs in the case of a deflation of the inner tube, or in case of an overload is effectively prevented and the destroying effect caused in the ordinary tires is thus overcome. And this is solely due to the particular design of the lateral walls of the tire which as shown, are made of substantial cross-section.

I claim:

In combination with an inner tube, a tire casing comprising a tread portion and inwardly inclined lateral walls, said walls being of substantial cross-section, the tread portion being of sufficient cross-section to automatically shift the lateral walls to a position parallel to the plane of the tire and to each other on deflation of the inner tube.

In testimony whereof I affix my signature.

HANS MAUL.